C. R. DISBROW.
Transplanter.
No. 69,642.   Patented Oct. 8, 1867.
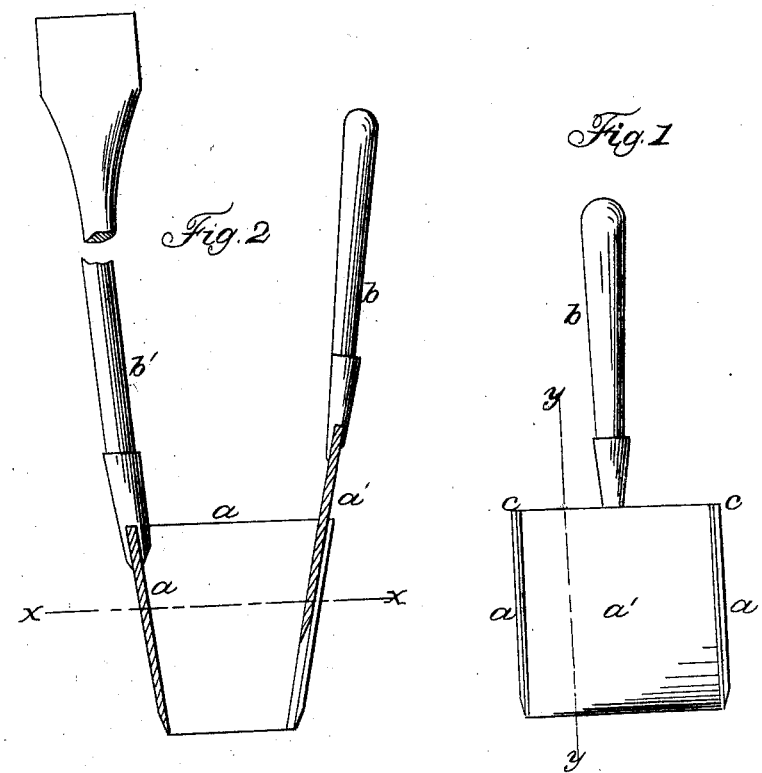
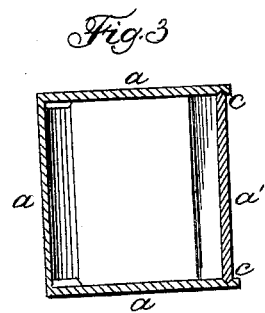

United States Patent Office.

CALEB R. DISBROW, OF BATH, NEW YORK.

Letters Patent No. 69,642, dated October 8, 1867.

---

TRANSPLANTER.

---

The Schedule referred to in these Letters Patent and making part of the same.

---

TO ALL WHOM IT MAY CONCERN:

Be it known that I, C. R. DISBROW, of Bath, in the county of Steuben, and State of New York, have invented a new and improved Transplanter; and I do hereby declare that the following is a full, clear, and exact description thereof, which will enable those skilled in the art to make and use the same, reference being had to the accompanying drawings, forming part of this specification, in which—

Figure 1 is an outside view of my improved transplanter.

Figure 2, a vertical section, taken in the line $y\,y$, fig. 1.

Figure 3, a horizontal section taken in the line $x\,x$, fig. 2.

Similar letters of reference indicate corresponding parts.

This invention relates to a new and improved mode of constructing an implement for the use of gardeners in transplanting plants and shrubs, to remove them with the soil in which they grow without disturbing the roots.

The implement is constructed of plate steel or malleable iron, and may be round or quadrangular. One side of it slides up and down, and leaves a space, when removed, to allow the implement to be placed around a plant or shrub from one side, without injury to the leaves or branches, before it is plunged into the earth around the roots.

The drawings illustrate my improved transplanter, of quadrangular form, with three sides, $a\,a\,a$, united at two of the corners, and one side, $a'$, made separately, to slide up and down in grooves $c\,c$ in the edges of the other sides. The implement is made tapering from top to bottom, just enough to hold the soil when a plant is removed by it. The sliding side $a'$ has a handle, $b$, attached to it like a spade, which it resembles in form, by which it is removed and replaced and made to penetrate the ground. A handle, $b'$, is also attached to the opposite side $a$, by which the implement is moved about, and a plant carried from place to place with safety and convenience. The side $a'$ may be made to slide in flanges on the edges, instead of grooves, as described.

The operation of my improved transplanter is manifest.

Having thus described my invention, what I claim as new, and desire to secure by Letters Patent, is—

A taper-formed transplanter, with a sliding side, $a'$, arranged substantially as and for the purpose herein described.

CALEB R. DISBROW.

Witnesses:
 H. A. COMPTON,
 JONAS VAN WIE.